US010900402B2

(12) United States Patent
Suzuki (10) Patent No.: US 10,900,402 B2
(45) Date of Patent: Jan. 26, 2021

(54) INTERNAL COMBUSTION ENGINE SYSTEM

(71) Applicant: TOYOTA JIDOSHA KABUSHIKI KAISHA, Aichi-ken (JP)

(72) Inventor: Yuki Suzuki, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/541,161

(22) Filed: Aug. 15, 2019

(65) Prior Publication Data

US 2020/0116060 A1 Apr. 16, 2020

(30) Foreign Application Priority Data

Oct. 15, 2018 (JP) .................. 2018-194264

(51) Int. Cl.
*F01N 3/20* (2006.01)
*F01N 9/00* (2006.01)
*B01D 53/94* (2006.01)

(52) U.S. Cl.
CPC .............. *F01N 3/208* (2013.01); *F01N 9/00* (2013.01); *B01D 53/9495* (2013.01); *F01N 2610/02* (2013.01); *F01N 2610/1406* (2013.01); *F01N 2610/1433* (2013.01); *F01N 2610/1453* (2013.01); *F01N 2610/1473* (2013.01); *F01N 2900/08* (2013.01); *F01N 2900/12* (2013.01); *F01N 2900/1814* (2013.01)

(58) Field of Classification Search
CPC ................. F01N 3/208; F01N 2610/02; F01N 2610/1406; F01N 2610/1433; F01N 2900/12; F01N 2900/08; F01N 2900/1814
See application file for complete search history.

(56) References Cited

U.S. PATENT DOCUMENTS

2008/0306631 A1* 12/2008 Huang .............. B01L 353/9431
700/271
2009/0277161 A1* 11/2009 Hodgson ................. F01N 3/208
60/297

FOREIGN PATENT DOCUMENTS

JP 2016-11621 A 1/2016
JP 2017-145745 A 8/2017
WO WO-2015060215 A1 * 4/2015 ............... F01N 9/00
WO WO-2017034470 A1 * 3/2017 ........... F01N 3/0814

* cited by examiner

*Primary Examiner* — Ngoc T Nguyen
(74) *Attorney, Agent, or Firm* — Hauptman Ham, LLP (57) ABSTRACT

An internal combustion engine system includes: an internal combustion engine mounted on a vehicle; a NOx selective reduction catalyst; a reducing agent supply device including a urea water addition valve configured to add urea water into the exhaust gas passage upstream of the NOx selective reduction catalyst, a urea water tank, a urea water flow passage that connects the urea water addition valve and the urea water tank, and a pump configured to supply the urea water addition valve with the urea water from the urea water tank; and a control device. The control device is configured to perform a runoff reduction control that controls at least one of the reducing agent supply device and the internal combustion engine such that the amount of runoff of the urea water from the urea water tank becomes less when the tilt angle of the vehicle is large than when it is small.

8 Claims, 7 Drawing Sheets

INTERNAL COMBUSTION ENGINE SYSTEM

CROSS-REFERENCE TO RELATED APPLICATION

This application is based on and claims the benefit of Japanese Patent Application No. 2018-194264, filed on Oct. 15, 2018, which is incorporated by reference herein in its entirety.

BACKGROUND

Technical Field

The present disclosure relates to an internal combustion engine system, and more particularly to an internal combustion engine system including a NOx selective reduction catalyst and a reducing agent supply device configured to supply it with a reducing agent of NOx.

Background Art

For example, JP 2017-145745 A discloses an exhaust gas purifying device for an internal combustion engine that includes a NOx selective reduction catalyst and a reducing agent supply device configured to supply it with a reducing agent (ammonia) of NOx.

This reducing agent supply device includes a urea water addition valve that adds a urea water that is a precursor of ammonia into a portion of an exhaust gas passage located on the upstream side of the NOx selective reduction catalyst, a urea water tank that stores the urea water, a urea water flow passage that connects the urea water addition valve and the urea water tank, and a pump that supplies the urea water addition valve with the urea water from the urea water tank through the urea water flow passage. At the time of engine stop, a suck back control is performed to operate the pump such that the urea water that remains in the urea water addition valve and the urea water flow passage moves to the urea water tank.

SUMMARY

For example, where, after a vehicle is parked on a slope, an internal combustion engine is started up and an idling operation is then performed, or where a vehicle is running on a slope, the operation of the internal combustion engine may be continuously performed with the vehicle tilted. In a vehicle on which an internal combustion engine system including a reducing agent supply device as disclosed in JP 2017-145745 A is mounted, if the vehicle is tilted, the surface of the urea water in a urea water tank is also tilted with respect to the urea water tank. There is a concern that, if the operation of the internal combustion engine is continuously performed with the surface of the urea water tilted in this way, it becomes difficult to suck out (retract) the urea water from the urea water tank. This leads to a shortening of the available time of the urea water when the vehicle is tilted.

The present disclosure has been made to address the problem described above, and an object of the present disclosure is to provide an internal combustion engine system that can reduce the shortening of the available time of the urea water due to a tilt of the vehicle.

An internal combustion engine system according to the present disclosure includes: an internal combustion engine mounted on a vehicle; a NOx selective reduction catalyst arranged in an exhaust gas passage of the internal combustion engine and configured to reduce NOx in exhaust gas using $NH_3$ as a reducing agent; a reducing agent supply device including a urea water addition valve configured to add urea water into a portion of the exhaust gas passage located on an upstream side of the NOx selective reduction catalyst, a urea water tank that stores the urea water, a urea water flow passage that connects the urea water addition valve and the urea water tank, and a pump configured to supply the urea water addition valve with the urea water from the urea water tank; and a control device configured to control the internal combustion engine and the reducing agent supply device. The control device is configured to perform a runoff reduction control that controls at least one of the reducing agent supply device and the internal combustion engine such that an amount of runoff of the urea water from the urea water tank becomes less when a tilt angle of the vehicle is large than when the tilt angle is small.

The control device may be further configured, at a time of engine stop, to perform a suck back control that returns the urea water remaining in the urea water flow passage into the urea water tank. The runoff reduction control may also be performed by the control device at a time of engine start-up that is performed after the engine stop associated with an execution of the suck back control.

The runoff reduction control may include a suck back reduction processing to reduce a sucked-back amount that is an amount of the urea water returned by the suck back control into the urea water tank at the time of engine stop. The suck back reduction processing may reduce the sucked-back amount when the tilt angle is large than when the tilt angle is small.

The suck back reduction processing may be performed by the control device when an outside air temperature is higher than or equal to a first threshold value that is higher than a freezing temperature of the urea water.

Where a possible travel distance of the vehicle based on the tilt angle and a remaining amount of the urea water in the urea water tank becomes shorter than a second threshold value, the runoff reduction control may be performed by the control device.

The urea water flow passage may include: a urea water supply passage through which the urea water supplied by the pump toward the urea water addition valve from the urea water tank flows; and a return flow passage, one end of which is connected to a portion of the urea water supply passage located between the pump and the urea water addition valve, and another end of which is arranged in the urea water tank. The runoff reduction control may also be a return flow rate reduction control that controls the reducing agent supply device such that a flow rate of the urea water flowing through the return flow passage is reduced.

The runoff reduction control may be an adsorbed reducing agent release control that controls the reducing agent supply device such that an $NH_3$ adsorption amount of the NOx selective reduction catalyst is reduced.

The runoff reduction control may be an engine discharged NOx reduction control that controls the internal combustion engine such that a concentration of NOx discharged from a cylinder of the internal combustion engine is reduced.

According to the internal combustion engine system of the present disclosure, the runoff reduction control is performed such that the amount of runoff of the urea water from the urea water tank becomes less when the tilt angle of the vehicle is large than when the tilt angle is small. As a result, shortening of the available time of the urea water due to a tilt of the vehicle can be reduced.

DETAILED DESCRIPTION

In the following, embodiments of the present disclosure, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

1. First Embodiment

A first embodiment according to the present disclosure will be described with reference to FIGS. 1 to 8.

1-1. Example of Configuration of Internal Combustion Engine System

Figure 1:
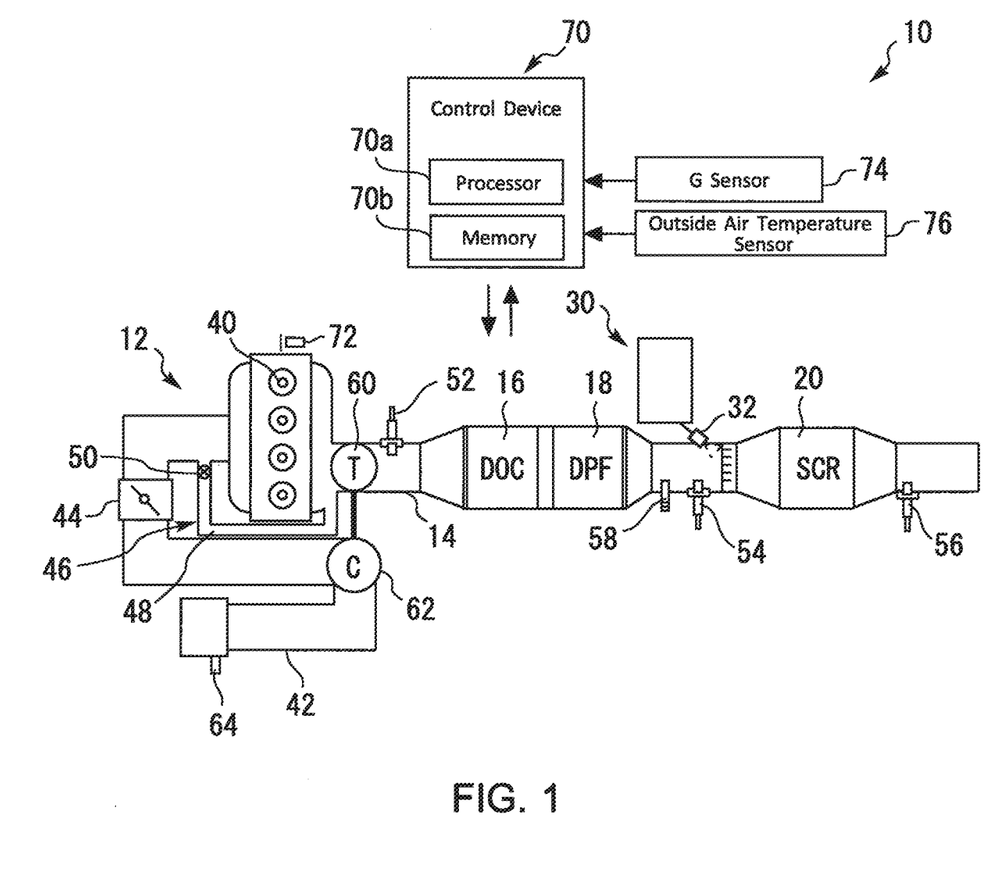
FIG. 1 is a schematic diagram for describing an example of the configuration of an internal combustion engine system according to a first embodiment of the present disclosure.

FIG. 1 is a schematic diagram for describing an example of the configuration of an internal combustion engine system 10 according to the first embodiment of the present disclosure. The internal combustion engine system 10 shown in FIG. 1 includes a compression-ignition internal combustion engine (diesel engine) 12 as an example. The internal combustion engine 12 is mounted on a vehicle (not shown).

An exhaust gas passage 14 communicates with each cylinder of the internal combustion engine 12. In order to purify the exhaust gas, a diesel oxidation catalyst (DOC) 16, a diesel particulate filter (DPF) 18 and a NOx selective reduction catalyst (or SCR (Selective Catalytic Reduction) catalyst) 20 as an example are arranged in the exhaust gas passage 14 in the order from the upstream side.

A urea water addition valve 32 of a reducing agent supply device 30 is arranged at a portion of the exhaust gas passage 14 located on the downstream side of the DPF 18 and the upstream side of the SCR catalyst 20. The SCR catalyst 20 is configured to reduce NOx in the exhaust gas using a reducing agent. The reducing agent supply device 30 corresponds to a device for supplying the SCR catalyst 20 with ammonia ($NH_3$) that is a reducing agent, and includes, as its main components, a urea water tank 34 described below with reference to FIG. 2, a urea water flow passage 36 and a pump 38 in addition to the urea water addition valve 32.

The urea water addition valve 32 adds (injects) a urea water that is a precursor of $NH_3$ into the exhaust gas passage 14. The urea water that is injected into the exhaust gas passage 14 from the urea water addition valve 32 is hydrolyzed to generate $NH_3$, which is supplied to the SCR catalyst 20. The SCR catalyst 20 reduces nitrogen oxides (NOx) in the exhaust gas using, as a reducing agent, $NH_3$ derived from the supplied urea water.

Moreover, a fuel injection valve 40 that injects fuel into the associated cylinder is arranged for each cylinder of the internal combustion engine 12. In addition, an intake air passage 42 communicates with each cylinder. An electronically controlled throttle 44 for adjusting the flow rate of intake air is arranged in the intake air passage 42. Furthermore, the internal combustion engine 12 is provided with an EGR device 46. The EGR device 46 includes an EGR passage 48 and an EGR valve 50. As an example, the EGR passage 48 connects a portion of the exhaust gas passage 14 located on the upstream side of a turbine 60 of a turbocharger and a portion of the intake air passage 42 located on the downstream side of a compressor 62 of the turbocharger (and the throttle 44). The EGR valve 50 adjusts the flow rate of EGR gas that flows through the EGR passage 48.

Moreover, in the exhaust gas passage 14, first to third NOx sensors 52, 54 and 56 and an exhaust gas temperature sensor 58 are arranged. To be more specific, the first NOx sensor 52 is located on the upstream side of the DOC 16 and outputs a signal responsive to the NOx concentration of the exhaust gas discharged from each cylinder. The second NOx sensor 54 and the exhaust gas temperature sensor 58 are located on the downstream side of the DPF 18 and the upstream side of the SCR catalyst 20. The second NOx sensor 54 and the exhaust gas temperature sensor 58 respectively output signals responsive to the NOx concentration and temperature of the exhaust gas that flows into the SCR catalyst 20. The third NOx sensor 56 is located on the downstream side of the SCR catalyst 20 and outputs a signal responsive to the NOx concentration of the exhaust gas that flows through a portion located downstream of the SCR catalyst 20.

Moreover, an air flow sensor 64 is arranged in the vicinity of an inlet of the intake air passage 42 of the internal combustion engine 12. The air flow sensor 64 outputs a signal responsive to the flow rate of air that flows through the intake air passage 42.

The internal combustion engine system 10 shown in FIG. 1 further includes a control device 70 for controlling the internal combustion engine 12 and the reducing agent supply device 30. The control device 70 is an electronic control unit (ECU) that includes a processor 70a and a memory 70b. The memory 70b stores various programs for controlling the internal combustion engine 12 and the reducing agent supply device 30. The processor 70a reads out a program from the memory 70b and executes the program. It should be noted that the control device 70 may be configured with a plurality of ECUs.

The control device 70 receives sensor signals from various sensors. The various sensors include, for example, a crank angle sensor 72, a vehicle acceleration sensor (G sensor) 74 and an outside air temperature sensor 76 as well as the NOx sensors 52, 54 and 56, the exhaust gas temperature sensor 58 and the air flow sensor 64 that are described above. The crank angle sensor 72 outputs a signal responsive to the crank angle. The control device 70 can calculate an engine speed by the use of signals from the crank angle sensor 72. The G sensor 74 is attached to the vehicle on which the internal combustion engine 12 is mounted, and is configured to output a signal responsive to the acceleration in the left/right direction, the forward/reverse direction and an oblique direction between these directions. The outside air temperature sensor 76 outputs a signal responsive to the outside air temperature. In addition, the processor 70a executes various programs by the use of received sensor signals, and also outputs actuating signals for controlling the above-described actuators (that is, the urea water addition valve 32 and pump 38 of the reducing agent supply device 30, and the fuel injection valves 40, the throttle 44 and the EGR valve 50).

Figure 2:
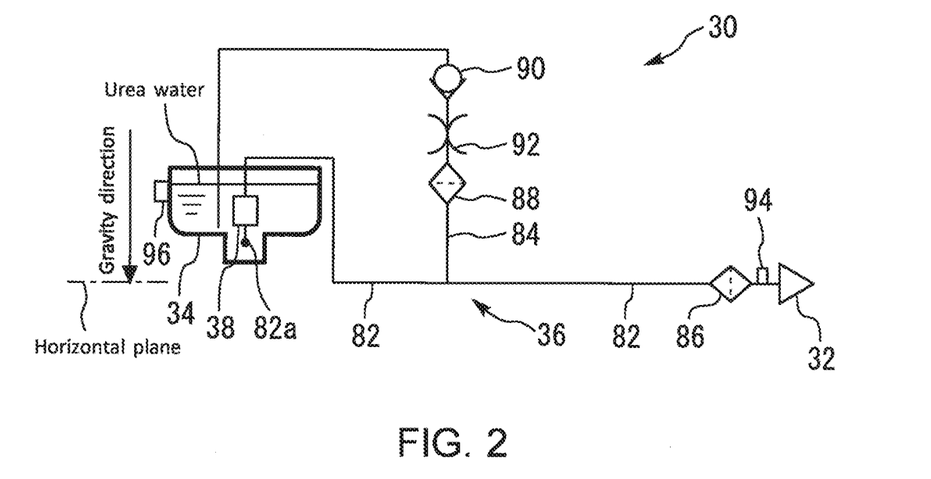
FIG. 2 is a diagram that schematically illustrates an example of the configuration of flow passages of a reducing agent supply device shown in FIG. 1.

FIG. 2 is a diagram that schematically illustrates an example of the configuration of flow passages of the reducing agent supply device 30 shown in FIG. 1. It should be noted that, with respect to the urea water tank 34, FIG. 2 depicts the urea water tank 34 which is mounted on the vehicle with the vehicle maintained horizontally with respect to the gravity direction.

As shown in FIG. 2, the urea water tank 34 stores the urea water. According to the example shown in FIG. 2, the urea water flow passage 36 is provided with a urea water supply passage 82 and a return flow passage 84. At the bottom portion of the urea water tank 34, a suction port 82a of the urea water corresponding to one end of the urea water supply passage 82 is arranged. At the other end of the urea water supply passage 82, the urea water addition valve 32 is arranged.

According to the example shown in FIG. 2, the pump 38 is arranged on the urea water supply passage 82 in the urea water tank 34. The pump 38 is an electrically driven gear pump as an example. In addition, the pump 38 is configured to be reversely rotatable. In more detail, the shape of the urea water tank 34 is not particularly limited. The urea water tank 34 in the example shown in FIG. 2 has a substantially cylindrical shape that is longer in the horizontal direction than in the gravity direction. In addition, the pump 38 and the suction port 82a are arranged at the center of the urea water tank 34 in the radial direction.

One end of the return flow passage 84 is connected to a portion of the urea water supply passage 82 located between the pump 38 and the urea water addition valve 32, and the other end (opening) is arranged in the urea water tank 34.

Moreover, an electro-magnetic valve 86 is arranged at a portion of the urea water supply passage 82 located between the pump 38 and the urea water addition valve 32. In the return flow passage 84, an electro-magnetic valve 88 is arranged. A check valve 90 is arranged at a portion of the return flow passage 84 that is closer to the urea water tank 34 relative to the electro-magnetic valve 88. The check valve 90 is configured to permit only a flow of the urea water toward the side of the urea water tank 34 from the side of the urea water supply passage 82. Furthermore, a restrictor 92 is arranged at a portion of the return flow passage 84 located between the electro-magnetic valve 88 and the check valve 90. The electro-magnetic valves 86 and 88 are electrically connected to the control device 70.

According to the reducing agent supply device 30 shown in FIG. 2, as a result of the pump 38 being actuated (positive rotation), the urea water can be sucked up into the urea water tank 34 and be supplied to the urea water supply passage 82. Also, as a result of the urea water at a higher pressure than a valve opening pressure of the check valve 90 being supplied to the return flow passage 84 by the pump 38, the flow of the urea water that returns to the urea water tank 34 through the return flow passage 84 can be formed.

Moreover, a pressure sensor 94 that outputs a signal responsive to the pressure of the urea water added by the urea water addition valve 32 (i.e., injection pressure of the urea water) is attached to the urea water supply passage 82. Furthermore, a float type liquid level sensor 96 for detecting the level of the urea water is installed in the urea water tank 34. By the use of the liquid level sensor 96, the remaining amount of the urea water in the urea water tank 34 can be grasped. In more detail, the control device 70 is configured to calculate a urea water remaining amount with the tilt angle of the vehicle taken into consideration, based on the outputs of the liquid level sensor 96 and the G sensor 74. It should be noted that a manner of obtaining the remaining amount of the urea water is not particularly limited. Thus, in order to obtain the remaining amount, a supersonic liquid level sensor, for example, may be used, instead of the liquid level sensor 96. The pressure sensor 94 and the liquid level sensor 96 are electrically connected to the control device 70.

1-2. Control of Internal Combustion Engine System

The control of the internal combustion engine system 10 includes not only a fuel injection control using the fuel injection valves, an intake air flow rate control using the throttle 44 and an EGR flow rate control using the EGR valve 50 that are used for controlling the engine torque but also a control of the reducing agent supply device 30 as described below.

1-2-1. Basic Operation of Reducing Agent Supply Device

In order to supply the urea water of an amount required to purify (reduce) NOx by the SCR catalyst 20 (hereunder, referred to as a "required urea water injection amount"), the reducing agent supply device 30 performs the following "urea water injection amount control" during engine operation. The required urea water injection amount is calculated on the basis of, for example, the concentration of the engine discharged NOx detected by the first NOx sensor 52 and a target NOx purification ratio according to engine operating conditions (for example, the fuel injection amount and the engine speed).

According to the urea water injection amount control, the discharge rate (L/h) of the pump 38 and the opening degrees of the electro-magnetic valves 86 and 88 are controlled such that the actual injection pressure of the urea water detected by the pressure sensor 94 becomes equal to a designated target injection pressure. On that basis, the valve opening time of the urea water addition valve 32 is controlled such that the urea water of an amount according to the required urea water injection amount is injected at the target injection pressure.

Additionally, according to the configuration of the reducing agent supply device 30 shown in FIG. 2, as already described, the flow of the urea water that returns to the urea water tank 34 through the return flow passage 84 can be formed. The flow rate of the urea water that flows through the return flow passage 84 in this way is referred to as a "return flow rate (overflow flow rate)". The control of the return flow rate can be performed by adjusting the discharge rate of the pump 38 and the opening degrees of the electromagnetic valves 86 and 88. According to the urea water injection control of the present embodiment, the discharge rate of the pump 38 and the opening degrees of the electromagnetic valves 86 and 88 are controlled such that, basically, the target injection pressure is satisfied while a large amount of this return flow rate is obtained. As a result, a decrease in the injection pressure associated with the execution of injection of the urea water can be reduced (that is, the injection pressure can be stabilized), and thus, the injection of an accurate amount of urea water can be stably performed.

1-2-2. Issue when Vehicle is Tilted

Figure 3:
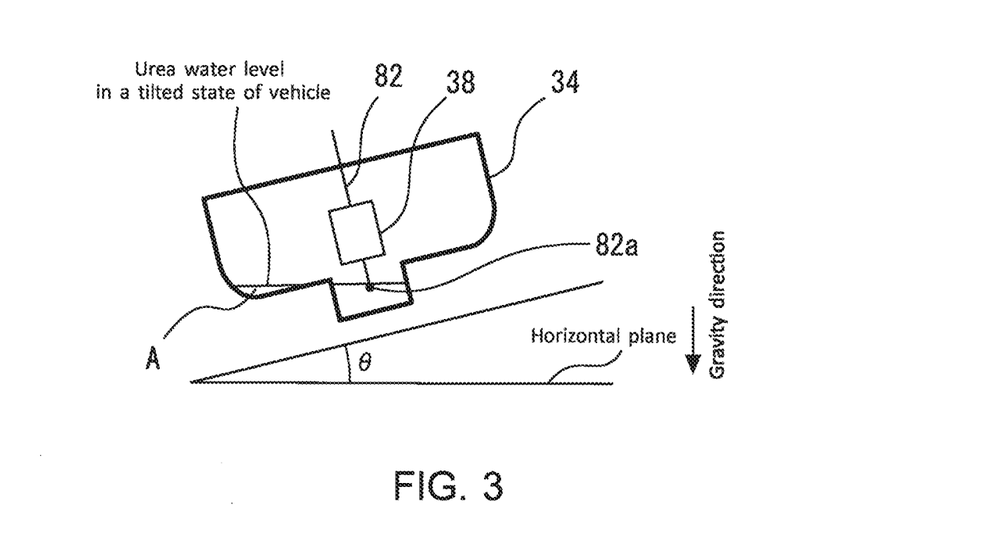
FIG. 3 is a diagram that illustrates a urea water tank with a low urea water remaining amount which is tilted by a tilt angle θ in a certain direction.

FIG. 3 is a diagram that illustrates the urea water tank 34 with a low urea water remaining amount which is tilted by a tilt angle θ in a certain direction. The tilt angle θ corresponds to a tilt angle with respect to the horizontal plane with respect to the gravity direction as shown in FIG. 3.

A vehicle may be parked with it tilted with respect to the horizontal plane. In addition, for example, when the vehicle is running on a slope, it is also tilted with respect to the horizontal plane. If the vehicle is tilted, the urea water tank 34 is also tilted with respect to the horizontal plane. If the urea water tank 34 with a low urea water remaining amount is tilted, it is presumed that, even where, if the urea water tank 34 is maintained horizontally, the suction port 82a is not exposed to the air in the urea water tank 34, the suction port 82a may be exposed to the air due to the tilt as shown in FIG. 3.

There is a concern that, if the internal combustion engine 12 is started up with the urea water tank 34 tilted as shown in FIG. 3 during parking and an idling operation is then performed continuously without moving the vehicle, it becomes difficult to suck out the urea water. This leads to a shortening of the available time of the urea water when the vehicle is tilted. In addition, a similar situation may occur when a vehicle running on a slope is continuously performed with the urea water tank 34 tilted as shown in FIG. 3.

Additionally, the exposure of the urea water in the air due to the tilt of the vehicle (urea water tank) becomes easy to occur when the urea water tank has a slim-line shape in the horizontal direction as with the urea water tank 34 due to a constraint concerning the mounting to the vehicle. In addition, where the vehicle is tilted in a certain direction, this exposure state becomes easier to occur when a suction port of urea water in a urea water tank is farther away from the center of the tank in the horizontal direction with respect to the gravity direction.

1-2-3. Outline of Runoff Reduction Control

In view of the issue described above, according to the present embodiment, a "runoff reduction control" is performed as follows. This runoff reduction control is performed so as to reduce the amount of runoff of the urea water from the urea water tank 34 (more specifically, the amount of runoff per unit time) when the tilt angle of the vehicle with respect to the horizontal plane is large than when it is small. Specific examples of the runoff reduction control used in the present embodiment are a "return flow rate reduction control", an "adsorbed reducing agent release control" and an "engine discharged NOx reduction control" that are described below.

1-2-3-1. Execution Condition of Runoff Reduction Control

Figure 4:
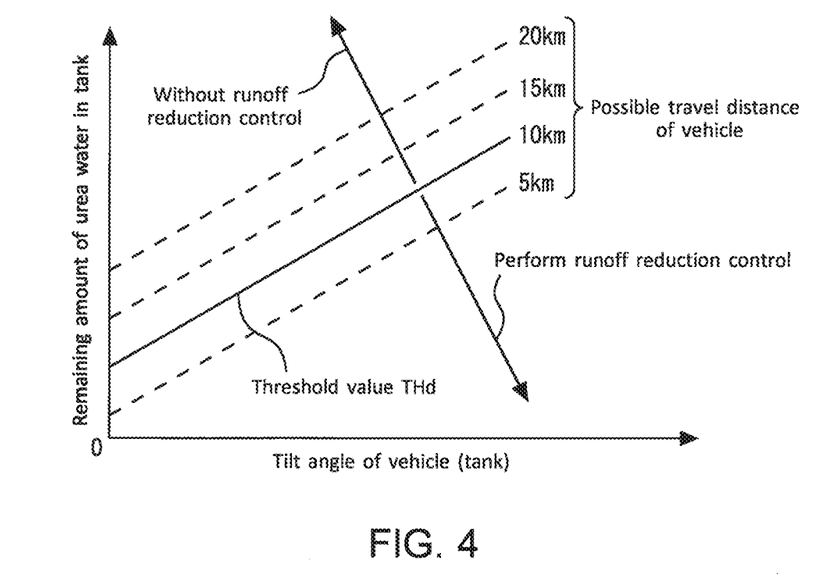
FIG. 4 is a graph for describing an example of the execution condition of a runoff reduction control according to the first embodiment of the present disclosure.

FIG. 4 is a graph for describing an example of the execution condition of the runoff reduction control according to the first embodiment of the present disclosure. The vertical axis of FIG. 4 denotes the urea water remaining amount in the urea water tank 34, and the horizontal axis thereof denotes the tilt angle of the vehicle (i.e., the tilt angle of the urea water tank 34).

In general, an internal combustion engine system using an SCR catalyst is configured such that, after the urea water remaining amount in a urea water tank becomes zero, the internal combustion engine can no longer be restarted. Because of this, as shown in FIG. 4, the less the urea water remaining amount is, the shorter the possible travel distance of the vehicle at the same tilt angle of the vehicle becomes.

Moreover, at the same urea water remaining amount, the larger the tilt angle of the vehicle is, the shorter the distance between the suction port 82a of the urea water and the urea water surface in the urea water tank 34 in the gravity direction becomes (that is, the earlier the suction port 82a becomes exposed to the air in association with a decrease of the remaining amount). Because of this, as shown in FIG. 4, the larger the tilt angle of the vehicle is, the shorter the possible travel distance of the vehicle at the same urea water remaining amount becomes.

According to the present embodiment, the possible travel distance of the vehicle is calculated on the basis of the urea water remaining amount and the tilt angle of the vehicle. An example of manner of the calculation is described below along with step S102 of a routine shown in FIG. 8. The calculated possible travel distance is compared to a designated threshold value THd (in the example shown in FIG. 4, 10 km). If, as a result, the possible travel distance becomes lower than the threshold value THd, the runoff reduction control is performed. The threshold value THd corresponds to an example of the "second threshold value" according to the present disclosure.

Additionally, in the example shown in FIG. 2 in which the suction port 82a of the urea water is arranged at the center of the urea water tank 34 in the radial direction thereof, the distance between the suction port 82a and the urea water surface does not change in accordance with the tilt direction of the vehicle. However, in another example in which the suction port is arranged, for example, at an end of a urea water tank in the radial direction thereof, the distance between the suction port and the urea water surface becomes the shortest when the vehicle is tilted to a specific direction. In this kind of example, the above-described execution condition of the runoff reduction control may be determined by the use of the tilt angle of the vehicle in the specific tilt direction.

1-2-3-2. Return Flow Rate Reduction Control

Figure 5:
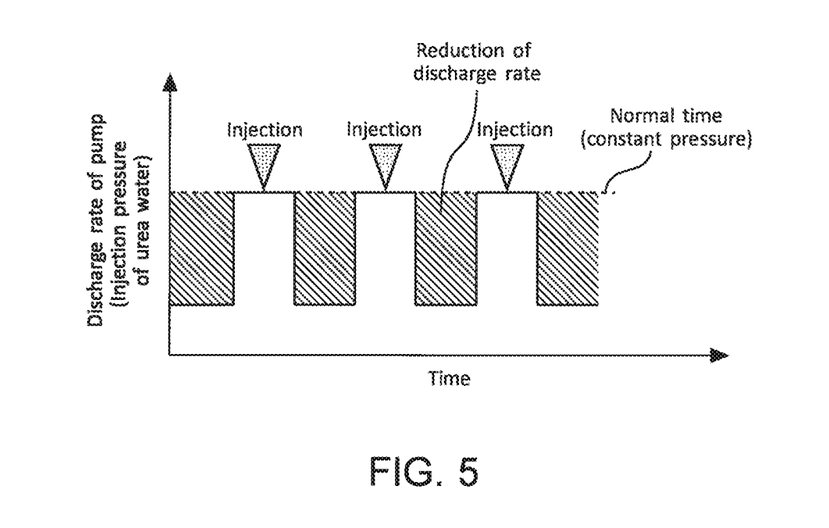
FIG. 5 is a time chart for describing an example of a return flow rate reduction control according to the first embodiment of the present disclosure.

FIG. 5 is a time chart for describing an example of the return flow rate reduction control according to the first embodiment of the present disclosure. The return flow rate reduction control according to the present embodiment is performed to control the reducing agent supply device 30 (in the example shown in FIG. 5, the pump 38) such that the flow rate (return flow rate) of the urea water (reducing agent) that flows through the return flow passage 84 is reduced.

The injection of the urea water according to the urea water injection amount control described above is periodically performed for each designated time period as shown in FIG. 5, provided that, for example, a designated injection execution condition (see the following section 1-2-3-3.) is satisfied. At the normal time (in other words, the time of the execution condition of the runoff reduction control being not satisfied), the rotational speed of the pump 38 is controlled such that the discharge rate (injection pressure) of the pump 38 becomes constant as shown by the broken line in FIG. 5. It should be noted that, since, as already described, the urea water injection amount control according to the present embodiment is performed with the return flow rate basically generated, the value of the discharge rate shown by this broken line is on the level of the check valve 90 (see FIG. 2) surely opening.

If, on the other hand, the execution condition of the runoff reduction control is satisfied, the discharge rate of the pump 38 is controlled by the return flow rate reduction control as shown by the solid line in FIG. 5. In detail, as shown in FIG. 5, the rotational speed of the pump 38 is controlled such that a discharge rate equivalent to the aforementioned broken line is achieved during each injection time of the urea water and times near the injection time, and such that, during a time other than these times (that is, at the time of non-injection), the discharge rate is reduced as compared to that shown by the broken line.

According to the return flow rate reduction control described above, during the injection times of the urea water periodically occurred and the times near the injection time, the average return flow rate during a time located between adjacent injection times can be reduced while the stabilization of the injection pressure is maintained by obtaining a discharge rate equivalent to that at the normal time. As a result, a required supply amount of the urea water by the pump 38 becomes less than that when the execution condition of the runoff reduction control is not satisfied, and thus, the amount of runoff of the urea water from the urea water tank 34 can be reduced as compared to that when the execution condition of the runoff reduction control is not satisfied.

Additionally, in an example in which a basic configuration is adopted such that the return flow rate is greatly obtained in order to stabilize the injection pressure as with the urea water injection amount control according to the present embodiment, an issue that the available time of the urea water may shorten due to a tilt of the vehicle becomes easy to occur. In this regard, according to the return flow rate reduction control described above, reduction of the runoff of the urea water from the urea water tank 34 (that is, reduction of the shortening the available time of the urea water) can be achieved owing to a decrease of the return flow rate when the vehicle is tilted, while the injection pressure is favorably stabilized by greatly obtaining the return flow rate at the normal time.

1-2-3-3. Adsorbed Reducing Agent Release Control

Figure 6:
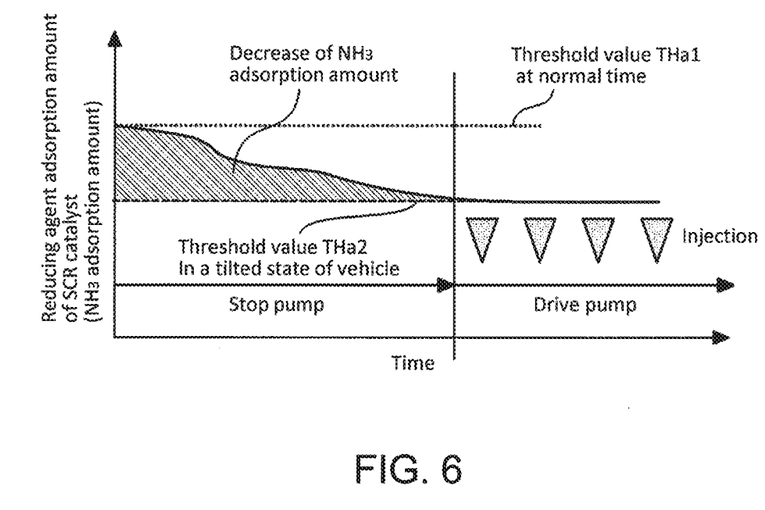
FIG. 6 is a time chart for describing an example of an adsorbed reducing agent release control according to the first embodiment of the present disclosure.

FIG. 6 is a time chart for describing an example of the adsorbed reducing agent release control according to the first embodiment of the present disclosure. An injection execution condition for determining whether execution of the injection of the urea water is required or not in the urea water injection amount control is that the adsorption amount of $NH_3$ of the SCR catalyst 20 (hereunder, referred to as an "$NH_3$ adsorption amount") becomes less than a threshold value.

At the normal time (i.e., when the execution condition of the runoff reduction control is not satisfied), a threshold value THa1 is used as a threshold value concerning the injection execution condition described above. If, on the other hand, the execution condition of the runoff reduction control is satisfied, a threshold value THa2 that is smaller than the threshold value THa1 is used in the adsorbed reducing agent release control. To be more specific, the threshold value THa1 is determined so as to have a designated margin. This can cope with a rapid increase of the amount of NOx discharged from each cylinder as a result of a change of the operating condition of the internal combustion engine 12.

According to the adsorbed reducing agent release control, the threshold value THa2 associated with reduction of a part of the margin described above is used. As a result, during execution of the adsorbed reducing agent release control, as shown in FIG. 6, the pump 38 remains stopped even if the $NH_3$ adsorption amount becomes less than the threshold value THa1 for the normal time (that is, the injection of the urea water is not performed). Also, where the $NH_3$ adsorption amount has become less than the threshold value THa2 thereafter, the driving of the pump 38 is started and the injection of the urea water is performed.

As described so far, according to the adsorbed reducing agent release control of the present embodiment, the threshold value THa2 that is smaller than the threshold value THa1 for the normal time is used as a threshold value for determining whether the injection execution condition of the urea water is satisfied or not. As a result, the reducing agent supply device 30 (the pump 38 and the urea water addition valve 32) is controlled so as to reduce the $NH_3$ adsorption amount as compared to that at the normal time. Because of this, the amount of runoff of the urea water from the urea water tank 34 can be reduced owing to a decrease of the required supply amount of the urea water by the pump 38 as compared to when the execution condition of the runoff reduction control is not satisfied. Furthermore, the consumption amount of the urea water (i.e., the amount of the urea water injected by the urea water addition valve 32) can also be reduced as compared to when the execution condition of the runoff reduction control is not satisfied. In addition, the execution of the adsorbed reducing agent release control also leads to a decrease of a required urea water addition amount described below (see FIG. 9).

Figure 7:
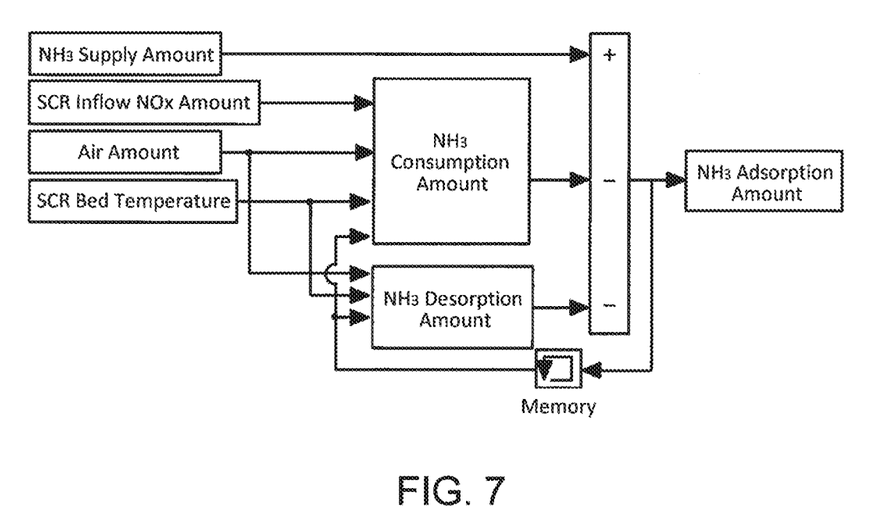
FIG. 7 is a block diagram for describing an example of manner of estimating an $NH_3$ adsorption amount.

It should be noted that an example of manner of estimating the $NH_3$ adsorption amount is as follows. FIG. 7 is a block diagram for describing an example of manner of estimating the $NH_3$ adsorption amount. According to an estimation manner described here, as shown by equation 1 mentioned below, the $NH_3$ adsorption amount is calculated by subtracting an $NH_3$ consumption amount and an $NH_3$ desorption amount from an $NH_3$ supply amount.

$$NH_3 \text{ adsorption amount} = NH_3 \text{ supply amount} - NH_3 \text{ consumption amount } NH_3 \text{ desorption amount} \quad (1)$$

First, the $NH_3$ supply amount in equation 1 corresponds to an amount of $NH_3$ supplied to the SCR catalyst 20 and is calculated as a value according to the required urea water injection amount described above.

Then, the $NH_3$ consumption amount corresponds to an amount of $NH_3$ that is consumed for purification (reduction) of NOx in the SCR catalyst 20, and is calculated as a value according to an SCR inflow NOx amount and a NOx reduction efficiency by the SCR catalyst 20. The SCR inflow NOx amount corresponds to an amount of NOx that flows into the SCR catalyst 20, and can be obtained by the use of, for example, the second NOx sensor 54. The NOx reduction efficiency can be calculated from a NOx reduction efficiency map based on, for example, an air amount, an SCR bed temperature (the temperature of the SCR catalyst 20) and the $NH_3$ adsorption amount (the last value stored in the memory 70b). The SCR bed temperature can be obtained by the use of, for example, the exhaust gas temperature sensor 58. The air amount described above is obtained on the basis of, for example, the intake air flow rate detected by the air flow sensor 64.

Then, the $NH_3$ desorption amount ($NH_3$ slip amount) corresponds to an amount of $NH_3$ that has desorbed from the SCR catalyst 20 due to an $NH_3$ slip which is a phenomenon in which $NH_3$ desorbs from the SCR catalyst 20, and is calculated to have a value according to the air amount described above and an $NH_3$ desorption concentration ($NH_3$ slip concentration). The $NH_3$ desorption concentration can be obtained by the use of, for example, the third NOx sensor 56, and may be obtained by the use of an $NH_3$ sensor. There is a correlation among the $NH_3$ desorption concentration, the SCR bed temperature and the $NH_3$ adsorption amount. To be more specific, if the $NH_3$ adsorption amount is constant, the $NH_3$ desorption concentration becomes greater when the SCR bed temperature is higher. Also, if the SCR bed temperature is constant, the $NH_3$ desorption amount becomes greater when the $NH_3$ adsorption amount is greater. The specific correlation can be obtained by, for example, conducting an experiment in advance. By using this kind of correlation as an example, the $NH_3$ desorption concentration is herein calculated from a $NH_3$ desorption concentration map based on the SCR bed temperature and the $NH_3$ adsorption amount (the last value stored in the memory 70b). Also, the $NH_3$ desorption amount can be calculated by multiplying the above-described air amount by the $NH_3$ desorption concentration calculated in this way.

The $NH_3$ adsorption amount is calculated by assigning, to equation 1 described above, the $NH_3$ supply amount, the $NH_3$ consumption amount and the $NH_3$ desorption amount that are calculated as described above. According to the urea water injection amount control of the present embodiment, the $NH_3$ adsorption amount calculated in this way is used as an estimated value thereof.

1-2-3-4. Engine Discharged NOx Reduction Control

The engine discharged NOx reduction control according to the present embodiment is performed to increase the fuel injection amount by the fuel injection valves 40 as compared to when the execution condition of the runoff reduction control is not satisfied. To be more specific, if an increment of the fuel injection amount is performed such that unburnt fuel becomes excess, the amount of oxygen becomes less at the time of combustion, and thus the concentration (amount) of NOx discharged from each cylinder (i.e., engine discharged NOx) can be reduced.

As already described, the required urea water injection amount for the urea water injection amount control is set on the basis of the concentration of the engine discharged NOx detected by the first NOx sensor 52. Because of this, the concentration of the engine discharged NOx is reduced by the engine discharged NOx reduction control, and the required urea water injection amount can thus be reduced. As a result, the consumption amount of the urea water (i.e., the amount of the urea water injected by the urea water addition valve 32) is reduced, and the amount of runoff of the urea water from the urea water tank 34 can therefore be reduced as compared to when the execution condition of the runoff reduction control is not satisfied.

Furthermore, according to the engine discharged NOx reduction control of the present embodiment that uses the increment of the fuel injection amount, the reduction of runoff of the urea water from the urea water tank 34 (that is, the reduction of shortening of the available time of the urea water) can be achieved by performing the switching to a combustion control given priority to reduction of discharge of NOx when the vehicle is tilted, while performing a combustion control given priority to the fuel efficiency at the normal time. In addition, the execution of the engine discharged NOx reduction control also leads to a decrease of the required urea water addition amount described below (see FIG. 9).

1-2-4. Processing by Control Device

Figure 8:
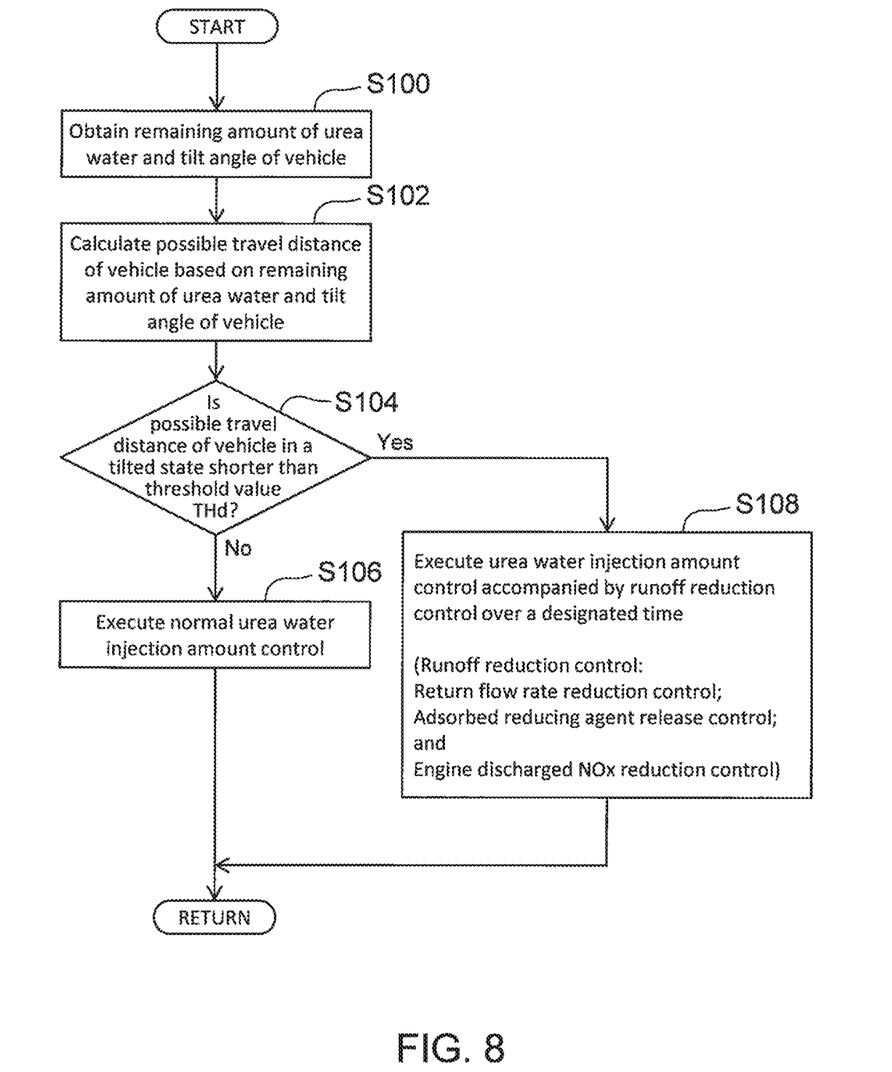
FIG. 8 is a flow chart that illustrates a routine of the processing concerning the runoff reduction control of the urea water according to the first embodiment of the present disclosure.

FIG. 8 is a flow chart that illustrates a routine of the processing concerning the runoff reduction control of the urea water according to the first embodiment of the present disclosure. The processing of the present routine is repeatedly performed during the operation of the internal combustion engine 12.

According to the routine shown in FIG. 8, first, in step S100 the control device 70 obtains the urea water remaining amount in the urea water tank 34 by the use of the liquid level sensor 96, and also obtains the tilt angle of the vehicle by the use of the G sensor 74.

Then, the control device 70 calculates the possible travel distance of the vehicle in step S102. The memory 70b of the control device 70 stores, as a map, a relationship as shown in FIG. 4 that is set in advance (that is, a relationship of the possible travel distance with respect to the urea water remaining amount and the tilt angle of the vehicle. In this step S102, the possible travel distance according to the urea water remaining amount and the tilt angle of the vehicle that are obtained in step S100 is calculated from this kind of map. It should be noted that the possible travel distance of the vehicle may be calculated using a relational equation that defines the relationship described above, instead of the map.

Then, the control device 70 determines in step S104 whether the possible travel distance of the vehicle calculated in step S102 is shorter than the threshold value THd described above. The threshold value THd can be, for example, be set as follows. That is to say, the threshold value THd may be a value that is longer or equal to a maximum consecutive distance traveled on a slope in a region in which the use of the vehicle is presumed, or be a value equivalent to the possible travel distance based on the remaining amount of the fuel of the vehicle. The reason why the latter setting is available is that a distance where the vehicle can run with the urea water used is not required to be set to be longer than the possible travel distance based on the remaining amount of the fuel.

If the determination result of step S104 is negative (possible travel distance≥threshold value THd), that is, if the execution condition of the runoff reduction control of the urea water is not satisfied, the processing proceeds to step S106. In step S106, the control device 70 executes a normal urea water injection amount control without being accompanied by the runoff reduction control.

If, on the other hand, the determination result of step S104 is positive (possible travel distance<threshold value THd), that is, if the execution condition of the runoff reduction control of the urea water is satisfied, the processing proceeds to step S108. In step S108, the control device 70 executes the urea water injection amount control accompanied by the runoff reduction control. According to the present embodiment, all of the return flow rate reduction control, the adsorbed reducing agent release control and the engine discharged NOx reduction control that are described above are executed as the runoff reduction control. According to an example of the runoff reduction control by the processing of step S108, the runoff reduction control is executed after an engine start-up is performed with the vehicle tilted (i.e., immediately after the engine start-up), and also executed when the vehicle is running on a slope.

The processing of step S108 is executed over a designated time, and thereafter, the current processing cycle of the present routine is ended. When thereafter, a tilt of the vehicle that satisfies the execution condition described above is eliminated (for example, when the tilt is eliminated due to the vehicle moving after an engine start-up is performed with the vehicle tilted, or when the vehicle finishes running on a slope), the determination result of step S104 becomes positive. As a result, the runoff reduction control is ended.

1-3. Advantageous Effects

According to the processing of the routine shown in FIG. 8 described so far, the runoff reduction control is executed when the possible travel distance of the vehicle based on the tilt angle of the vehicle and the remaining amount of the urea water becomes shorter than the threshold value THd. According to this kind of execution condition, in the same remaining amount condition of the urea water, the runoff reduction control is not executed under such a small tilt angle of the vehicle as to cause the possible travel distance to be longer than or equal to the threshold value THd, whereas the runoff reduction control is executed under such a large tilt angle of the vehicle as to cause the possible travel distance to be shorter than the threshold value THd. Furthermore, the reducing agent supply device 30 (the pump 38 and the urea water addition valve 32) is controlled to perform the return flow rate reduction control and the adsorbed reducing agent release control that are included in the runoff reduction control, and the internal combustion engine 12 (the fuel injection valves 40) is controlled to perform the engine discharged NOx reduction control.

Therefore, according to the processing of the routine described above, the runoff reduction control that controls each of the internal combustion engine 12 and the reducing agent supply device 30 is performed such that, in the same remaining amount condition of the urea water, the amount of runoff of the urea water from the urea water tank 34 becomes less when the tilt angle of the vehicle is large than when it is small. To be more specific, according to the present embodiment, each of the return flow rate reduction control, the adsorbed reducing agent release control and the engine discharged NOx reduction control that are included in the runoff reduction control is performed such that, in the same remaining amount condition of the urea water, the amount of runoff of the urea water from the urea water tank 34 becomes less when the tilt angle of the vehicle is large than when it is small. As a result, the shortening of the available time of the urea water due to the tilt of the vehicle can be reduced.

1-4. Modification Examples with Respect to First Embodiment

1-4-1. Other Examples of Return Flow Rate Reduction Control

According to the return flow rate reduction control of the first embodiment described above, the discharge rate (rotational speed) of the pump 38 is controlled to reduce the return flow rate. However, according to the example of the reducing agent supply device 30 provided with the electro-magnetic valves 86 and 88, the "return flow rate reduction control" according to the present disclosure may be performed, for example, as follows, instead of or in addition to the example described above. That is to say, the return flow rate reduction control may be performed to reduce restriction of the flow of the urea water toward the urea water addition valve 32 in the urea water flow passage 36 in order to reduce the return flow rate. In detail, the return flow rate may be reduced by decreasing the opening degree of the electro-magnetic valve 88 arranged in the return flow passage 84 or by increasing the opening degree of the electro-magnetic valve 86 arranged immediately upstream of the urea water addition valve 32.

Furthermore, in contrast to the reducing agent supply device 30, the return flow rate reduction control in an example of a reducing agent supply device without including the electro-magnetic valve 88 arranged in the return flow passage 84 may be performed, for example, as follows, instead of or in addition to the example described in the first embodiment. That is to say, where a "suck back control" as described in the following second embodiment is performed during an engine stop for the purpose of prevention of freezing of the urea water flow passage 36, it is required to perform an operation to supply, from the urea water tank 34, the urea water for filling the interior of the urea water flow passage 36 (and the interior of the pump 38) (hereunder, referred to as a "priming operation"). An example of the return flow rate reduction control performed during an engine start-up may be a low pressure priming operation to perform a priming operation such that such a low pressure (low flow rate) urea water that the check valve 90 does not open is supplied to the urea water flow passage 36.

1-4-2. Other Examples of Adsorbed Reducing Agent Release Control

The adsorbed reducing agent release control according to the first embodiment is performed by the use of a change of threshold values concerning the injection execution of the urea water injection amount control (i.e., a change from the threshold value THa1 for the normal time to the threshold value THa2 smaller than the threshold value THa1). However, the "adsorbed reducing agent release control" according to the present disclosure may be performed, for example, as follows, instead of the example described above. That is to say, in another example of the adsorbed reducing agent release control, where the urea water injection amount control is started at the time of engine start-up, the pump 38 may be stopped (i.e., the amount of the urea water injected by the urea water addition valve 32 may be made zero) over a designated time period according to the $NH_3$ adsorption amount. In more detail, according to this example, the stop time period of the pump 38 may be set, for example, so as to be longer when the $NH_3$ adsorption amount is greater.

1-4-3. Other Examples of Engine Discharged NOx Reduction Control

The engine discharged NOx reduction control according to the first embodiment is performed by the use of an increment of the fuel injection amount by the fuel injection valves 40. However, the "engine discharged NOx reduction control" according to the present disclosure may be performed, for example, as follows, instead of the example described above. That is to say, in another example of the engine discharged NOx reduction control, as compared to the execution condition of the runoff reduction control is not satisfied, the EGR gas amount may be increased with the adjustment of the opening degree of the EGR valve 50 or the intake air amount may be decreased with the adjustment of the opening degree of the throttle 44. According to this increment of the EGR gas amount, the engine discharged NOx concentration can be reduced due to the effects, such as a decrease of the combustion temperature. Moreover, according to this decrement of the intake air amount, the amount of oxygen becomes less at the time of combustion, and the engine discharge NOx concentration can thus be reduced. Furthermore, any two or all (three) of the increment of the fuel injection amount, the increment of the EGR gas amount and the decrement of the intake air amount may be performed as the engine discharged NOx reduction control.

1-4-4. Other Examples of Execution of Runoff Reduction Control

According to the first embodiment, three controls, that is, the "return flow rate reduction control", the "adsorbed reducing agent release control" and the "engine discharged NOx reduction control" are performed as the runoff reduction control of the urea water from the urea water tank 34. However, as other examples of the runoff reduction control, any one or any two of the three may be performed, instead of the example described above.

2. Second Embodiment

Then, a second embodiment according to the present disclosure will be described with reference to FIGS. 9 and 10. An example of the hardware configuration of the internal combustion engine 10 according to the second embodiment is the same as that according to the first embodiment (see FIGS. 1 and 2).

2-1. Control of Internal Combustion Engine System

The control of the internal combustion engine 10 according to the present embodiment is different from the control according to first embodiment in terms of the runoff reduction control including a "suck back reduction processing" that is performed along with a "suck back control".

2-1-1. Suck Back Control

In order to prevent the urea water flow passage 36 from being broken due to the fact that the urea water that remains in the urea water flow passage 36 (the urea water supply passage 82 and the return flow passage 84) freezes during an engine stop, the reducing agent supply device 30 performs a "suck back control" as follows during the engine stop.

The suck back control is performed, at the time of engine stop, in order to return, into the urea water tank 34, the urea water that remains in the urea water flow passage 36. In detail, according to the suck back control, the pump 38 is reversely rotated, whereby the urea water is returned into the urea water tank 34. It should be noted that the urea water addition valve 32 and the electro-magnetic valves 86 and 88 are opened during execution of the suck back control.

2-1-2. Issue on Suck Back Control Performed when Vehicle is Parked on Slope, and Outline of Suck Back Reduction Processing FIG. 9 is a graph for describing an issue on the suck back control performed when the vehicle is parked on a slope, and the outline of the suck back reduction processing as a countermeasure against the issue.

Figure 9:
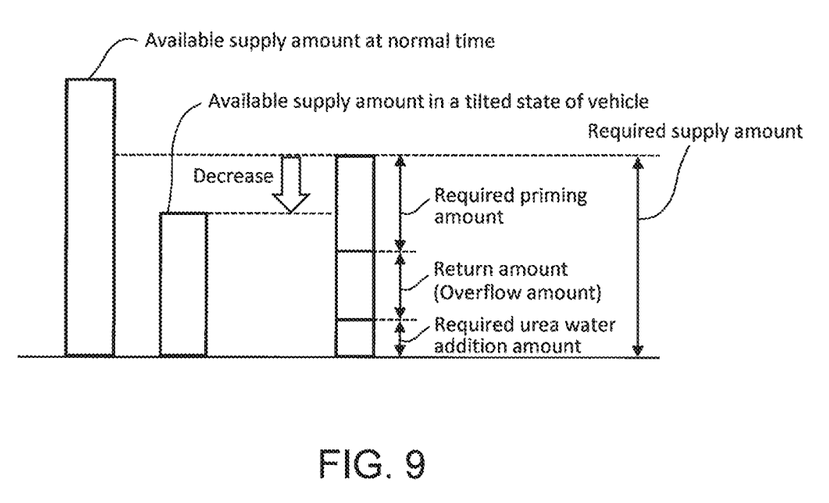
FIG. 9 is a graph for describing an issue on a suck back control performed when a vehicle is parked on a slope, and the outline of a suck back reduction processing as a countermeasure against the issue.

In FIG. 9, calculated values of two "available supply amounts" are represented. These available supply amounts each correspond to an amount (cc) of the urea water in the urea water tank 34 that can be supplied by the pump 38, and, as an example, are calculated on the basis of the remaining amount of the urea water and the tilt angle of the vehicle. In more detail, similarly to the relationship shown in FIG. 4 (i.e., the relationship of the possible travel distance of the vehicle with respect to the remaining amount of the urea water and the tilt angle of the vehicle), the available supply amounts are calculated so as to become less when the remaining amount of the urea water is less, and also become less when the tilt angle of the vehicle is larger.

On that basis, the available supply amount at the normal time corresponds to an available supply amount used when the execution condition of the runoff reduction control is not satisfied, and the available supply amount in a tilted state of the vehicle corresponds to an available supply amount used when the execution condition of the runoff reduction control is satisfied. Because of this, as shown in FIG. 9 as an example, the available supply amount in a tilted state of the vehicle becomes less than that for the normal time. Also, according to the example shown in FIG. 9, the available supply amount in a tilted state of the vehicle is less than the amount of the urea water required for the supply of the urea water by the pump 38 (hereunder, referred to as "required supply amount"). Therefore, when the vehicle is tilted, it is desirable to reduce the required supply amount.

As shown in FIG. 9, the required supply amount corresponds to the sum of a "required urea water addition amount", a "return amount (overflow amount)" and a "required priming amount" (the unit of them is "cc"). First, the required urea water addition amount is calculated on the basis of a designated possible travel distance of the vehicle that should be at least guaranteed when the vehicle is tilted, and a urea water consumption amount that would be required to purify NOx when the vehicle runs the possible travel distance. The return amount corresponds to an amount of the urea water that circulates in the return flow passage 84 when the vehicle runs the possible travel distance described above, and is determined on the basis of the hardware specification of the reducing agent supply device 30 and the operating time of the pump 38 required to inject the urea water of the required urea water addition amount. In addition, the sum of these required urea water addition amount and return amount corresponds to an amount of the urea water required for the vehicle to travel a distance equivalent to the threshold value THd of the possible travel distance when the vehicle is tilted.

The required priming amount corresponds to an amount of the urea water required for the priming operation at the time of engine start-up to fill the interior of the urea water flow passage 36 (and the interior of the pump 38) in which the amount of the urea water has been reduced by the suck back control performed at the time of engine stop. Because of this, the required priming amount becomes greater when the urea water flow passage 36 is longer. Also, the required priming amount becomes greater when a sucked-back amount of the urea water by the suck back control is greater, because the amount of the urea water that remains in the urea water flow passage 36 becomes less.

It can be said that, if the total amount of the urea water that has been returned to the interior of the urea water tank 34 by the suck back control can be sucked out from the urea water tank 34 with the pump 38 at the time of the subsequent engine start-up, all of the sucked-back amount can be used as a required priming amount. However, when the vehicle is tilted, all of the sucked-back amount may not be used, depending on the shape of the urea water tank 34, the location of the suction port 82a, and the urea water remaining amount in the urea water tank 34. In detail, according to the example of the tank shape and tilt angle θ shown in FIG. 3, where a part of the urea water that has been returned to the interior of the urea water tank 34 by the suck back control is located in a portion A in FIG. 3, this portion A becomes a dead volume when the vehicle is tilted, and, as a result, the urea water in the portion A may no longer be effectively sucked out at the next engine start-up. Therefore, in order to increase the available supply amount of the pump 38 as large as possible with also this kind of issue taken into consideration when the vehicle is tilted, it can be said that reducing the sucked-back amount during an engine stop is effective.

In view of the issue described above, according to the present embodiment, where an execution condition shown below is satisfied, the suck back control is performed while the sucked-back amount is reduced by the following "suck back reduction processing". First, the execution condition of the suck back reduction processing includes a condition that the possible travel distance of the vehicle is shorter than the threshold value THd during an engine stop. This condition is the same as the execution condition of the runoff reduction control according to the first embodiment. Where this condition is not satisfied, the suck back control is performed without being accompanied by the suck back reduction processing.

Moreover, the execution condition of the suck back reduction processing includes a condition that the outside air temperature is higher than or equal to a threshold value THt. The threshold value THt of the outside air temperature is a value that is higher than the freezing temperature of the urea water in use. In more detail, the reason why this kind of condition of the outside air temperature is included in the execution condition of the suck back reduction processing is to reduce the sucked-back amount while the urea water flow passage 36 is prevented from being broken due to the freezing of the urea water that remains in the urea water flow passage 36 during an engine stop. It should be noted that the threshold value THt corresponds to an example of the "first threshold value" according to the present disclosure.

According to the suck back reduction processing according to the present embodiment, a required sucked-back amount which corresponds to a target value of the sucked-back amount by the suck back control is calculated in a manner described below as an example. As exemplified in FIG. 9, the required supply amount may become greater than the available supply amount in a tilted state of the vehicle (i.e., a calculated value based on the remaining amount of the urea water and the tilt angle of the vehicle during an engine stop), depending on the remaining amount of the urea water, the tilt angle of the vehicle and the sucked-back amount that are obtained when the vehicle is parked on a slope. This means that the urea water of an amount equivalent to a difference between the required supply amount and the available supply amount becomes insufficient. Because of this, the execution condition of the suck back reduction processing includes a condition that the required supply amount becomes greater than the available supply amount in a tilted state of the vehicle.

According to the suck back reduction processing, the required sucked-back amount is calculated in accordance with a relationship of equation 2 mentioned below. That is to say, the required sucked-back amount is calculated as a value obtained by subtracting the required urea water addition amount and return amount from the available supply amount in a tilted state of the vehicle.

$$\text{Required sucked-back amount} = \text{Available supply amount in a tilted state of the vehicle} - \text{Required urea water addition amount} - \text{Return amount} \quad (2)$$

According to the required sucked-back amount calculated as just described, the sucked-back amount of the urea water by the priming operation can be reduced such that the required supply amount does not exceed the available supply amount in a tilted state of the vehicle. It should be noted that, in order to more reliably ensure that the available supply amount is greater than the required supply amount, the required sucked-back amount according to equation 2 may be reduced by a designated safety margin.

2-1-3. Processing by Control Device

Figure 10:
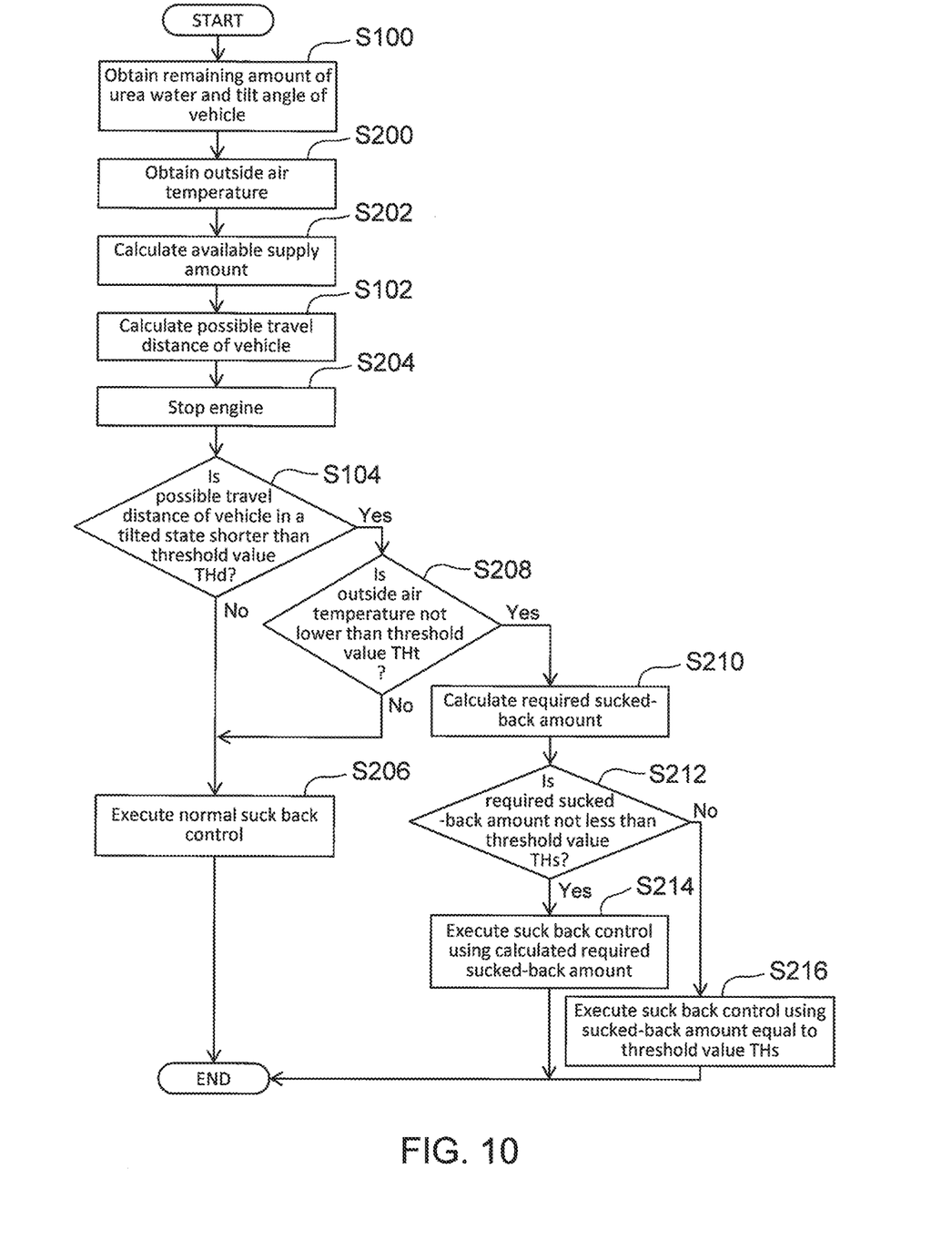
FIG. 10 is a flow chart that illustrates a routine of the processing concerning the suck back control along with the suck back reduction processing according to a second embodiment of the present disclosure.

FIG. 10 is a flow chart that illustrates a routine of the processing concerning the suck back control along with the suck back reduction processing according to the second embodiment of the present disclosure. The present routine is started up when an engine stop request is issued during an engine operation. It should be noted that a processing other than the suck back reduction processing in the runoff reduction control according to the present embodiment is performed in accordance with the processing of the routine shown in FIG. 8, similarly to the first embodiment. In addition, the processing of steps S100 to S104 in the routine shown in FIG. 10 is as already described in the first embodiment.

According to the routine shown in FIG. 10, following the processing of step S100, the control device 70 obtains, in step S200, the outside air temperature by the use of the outside air temperature sensor 76. Then, in step S202, the control device 70 calculates the available supply amount (see FIG. 9) based on the remaining amount of the urea water and the tilt angle of the vehicle. In the memory 70b of the control device 70, a map that defines a relationship of the available supply amount with respect to the remaining amount of the urea water and the tilt angle of the vehicle is stored, similarly to the relationship between the possible travel distance of the vehicle with respect to the remaining amount of the urea water and the tilt angle of the vehicle shown in FIG. 4. In this step S202, the available supply amount according to the remaining amount of the urea water and the tilt angle of the vehicle that are obtained in step S200 is calculated from this kind of map. It should be noted that the available supply amount may be calculated by the use of a relational equation that defines the relationship described above, instead of the map.

The control device 70 executes an engine stop (i.e., stop of the fuel injection) in step S204 after executing the processing of step S102 following the processing of step S202. Then, the control device 70 determines in step S104 whether the possible travel distance of the vehicle is shorter than the threshold value THd or not.

If the determination result of step S104 is negative (possible travel distance≥threshold value THd), the processing proceeds to step S206. In step S206, the control device 70 executes the normal suck back control without being accompanied by the suck back reduction processing.

If, on the other hand, the determination result of step S104 is positive (possible travel distance<threshold value THd), the processing proceeds to step S208. In step S208, the control device 70 determines whether or not the outside air temperature is not lower than the threshold value THt described above. As a result, if this determination result is negative (outside air temperature<threshold value THt), the processing proceeds to step S206, and the normal suck back control is executed without being accompanied by the suck back reduction processing.

If, on the other hand, the determination result of step S208 is positive, (outside air temperature≥threshold value THt), the processing proceeds to step S210. In step S210, if the required supply amount is greater than the available supply amount in a tilted state of the vehicle, the control device 70 calculates the required sucked-back amount in accordance with equation 2 mentioned above. To perform this calculation, the available supply amount in a tilted state of the vehicle calculated in step S202 is used. If, on the other hand, the available supply amount in a tilted state is greater than or equal to the required supply amount, the required sucked-back amount is not reduced by the suck back reduction processing and is calculated as a value that is equal to the required priming amount.

Then, in step S212, the control device 70 determines whether or not the required sucked-back amount calculated in step S210 is not smaller than a threshold value THs. This threshold value THs is determined to be such a value that the sucked-back amount does not become too small due to an execution of the suck back reduction processing, just in case of the occurrence of freezing of the urea water due to a rapid change of the outside air temperature after an engine stop. To be more specific, as an example, the threshold value THs is determined as a value that is greater by a designated margin with respect to volume expansion due to a freezing of the remaining urea water in the urea water flow passage 36.

If the determination result of step S212 is positive (required sucked-back amount≥threshold value THs), the processing proceeds to S214. In step S214, the control device 70 executes the suck back control using a sucked-back amount equal to the calculated required sucked-back amount.

If, on the other hand, the determination result of step S212 is negative (required sucked-back amount<threshold value THs), the processing proceeds to step S216. In step S216, the control device 70 executes the suck back control using a sucked-back amount equal to the threshold value THs. As just described, according to the processing of steps S212 to S216, where the required sucked-back amount calculated in accordance with equation 2 described above is too less, the sucked-back amount equivalent to the threshold value THs is obtained in order to address the freezing of the urea water.

2-2. Advantageous Effects 2-2-1. Advantageous Effects Concerning Combination of Suck Back Control and Runoff Reduction Control According to the second embodiment described so far, in the configuration in which the suck back control is performed during an engine stop, the runoff reduction control is performed where the execution condition (i.e., the condition that the possible travel distance of the vehicle is shorter than threshold value THd) is satisfied at the time of engine start-up. As already described, when the vehicle is tilted, such a situation that the sucked-back amount cannot be fully used as a required priming amount is envisaged depending on the shape of the urea water tank 34, the location of the suction port 82a and the remaining amount of the urea water in the urea water tank 34. Furthermore, this leads to an increase of use of the urea water in the urea water tank 34 that can be sucked out therefrom (in the example shown in FIG. 3, an increase of use of the urea water in a portion other than the portion A). In this regard, as a result of the runoff reduction control being performed at the time of engine start-up (more specifically, immediately after the engine start-up), the outflow of the urea water from the urea water tank 34 is reduced. As just described, in order to reduce the shortening of the available time of the urea water due to a tilt of the vehicle when the situation described above occurs, the execution of the runoff reduction control at the time of engine start-up is effective.

2-2-2. Advantageous Effects Concerning Suck Back Reduction Processing

As described so far, the execution condition of the suck back reduction processing includes the condition that the possible travel distance of the vehicle based on the tilt angle of the vehicle and the remaining amount of the urea water becomes shorter than the threshold value THd. According to this kind of condition, in the same remaining amount condition of the urea water, the suck back reduction processing is not performed under such a small tilt angle of the vehicle as to make the possible travel distance longer than or equal to the threshold value THd, and, on the other hand, the suck back reduction processing is performed under such a large tilt angle of the vehicle as to make the possible travel distance shorter than the threshold value THd. Because of this, in the same remaining amount condition of the urea water, the suck back reduction processing according to the present embodiment is performed such that the sucked-back amount becomes less when the tilt angle of the vehicle is large than when it is small. As a result, even in the above-described situation in which the sucked-back amount cannot be fully used as the required priming amount when the vehicle is tilted, the available supply amount of the pump 38 can be obtained as large as possible when the vehicle is tilted.

Furthermore, the execution condition of the suck back reduction processing includes the condition that the outside air temperature is higher than or equal to the threshold value THt. As a result, the sucked-back amount can be reduced while the urea water flow passage 36 is prevented from being broken due to a freezing of the urea water that remains in the urea water flow passage 36 during an engine stop.

2-3. Another Example of Execution of Suck Back Reduction Processing

According to the second embodiment described above, the execution condition of the suck back reduction processing includes the condition that the outside air temperature is higher than or equal to the threshold value THt. However, the "suck back reduction processing" according to the present disclosure may be performed without being accompanied by the above-described condition of the outside air temperature, instead of the example described above.

3. Other Embodiments (Other Examples of Execution of Runoff Reduction Control)

According to the first and second embodiments described above, as an example of execution of the runoff reduction control "that reduces the amount of runoff of the urea water from the urea water tank when the tilt angle of the vehicle is large than when the tilt angle is small", where the possible travel distance of the vehicle becomes shorter than the threshold value THd, the runoff reduction control is performed. However, in the "runoff reduction control" according to the present disclosure, only the magnitude of the tilt angle of the vehicle may be judged without using the remaining amount of the urea water, instead of the example described above. On that basis, the runoff reduction control may be performed such that the amount of runoff of the urea water from the urea water tank becomes less when the tilt angle of the vehicle is large than when the tilt angle is small.

In addition, the runoff reduction control "that reduces the amount of runoff of the urea water from the urea water tank when the tilt angle of the vehicle is large than when the tilt angle is small" includes an example in which the above-described amount of runoff is reduced when the vehicle is tilted with respect to the horizontal plane, as compared to when the vehicle is not tilted. Also, the runoff reduction control includes an example in which the above-described amount of runoff is reduced when the tilt angle of the vehicle is larger than or equal to a designated threshold value, as compared to when the tilt angle is smaller than this threshold value. Moreover, the runoff reduction control includes an example in which the above-described amount of runoff is controlled such that the greater the tilt angle of the vehicle is, the less the amount of runoff becomes. Furthermore, where, instead of the possible travel distance of the vehicle, the available supply amount, for example, calculated by the processing of step S202 becomes smaller than a designated threshold value, the runoff reduction control may be performed.

The embodiments and modification examples described above may be combined in other ways than those explicitly described above as required and may be modified in various ways without departing from the scope of the present disclosure.

What is claimed is:

1. An internal combustion engine system, comprising:
   an internal combustion engine mounted on a vehicle;
   a NOx selective reduction catalyst arranged in an exhaust gas passage of the internal combustion engine and configured to reduce NOx in exhaust gas using $NH_3$ as a reducing agent;
   a reducing agent supply device including a urea water addition valve configured to add urea water into a portion of the exhaust gas passage located on an upstream side of the NOx selective reduction catalyst, a urea water tank that stores the urea water, a urea water flow passage that connects the urea water addition valve and the urea water tank, and a pump configured to supply the urea water addition valve with the urea water from the urea water tank; and
   a control device configured to control the internal combustion engine and the reducing agent supply device,
   wherein the control device is configured to perform a runoff reduction control that controls at least one of the reducing agent supply device and the internal combustion engine such that an amount of runoff of the urea water from the urea water tank is reduced when a tilt angle of the vehicle is greater than or equal to a threshold value, as compared to when the tilt angle is smaller than the threshold value.

2. The internal combustion engine system according to claim 1,
   wherein the control device is further configured, at a time of engine stop, to perform a suck back control that returns the urea water remaining in the urea water flow passage into the urea water tank, and
   wherein the runoff reduction control is performed by the control device at a time of engine start-up that is performed after the engine stop associated with an execution of the suck back control.

3. The internal combustion engine system according to claim 2,
   wherein the runoff reduction control includes a suck back reduction processing to reduce a sucked-back amount that is an amount of the urea water returned by the suck back control into the urea water tank at the time of engine stop, and
   wherein the suck back reduction processing reduces the sucked-back amount when the tilt angle is greater than or equal to the threshold value, as compared to when the tilt angle is smaller than the threshold value.

4. The internal combustion engine system according to claim 3,
   wherein the suck back reduction processing is performed by the control device when an ambient air temperature is higher than or equal to a first threshold value that is higher than a freezing temperature of the urea water.

5. The internal combustion engine system according to claim 1,
   wherein, where a possible travel distance of the vehicle based on the tilt angle and a remaining amount of the urea water in the urea water tank becomes shorter than a second threshold value, the runoff reduction control is performed by the control device.

6. The internal combustion engine system according to claim 1,
   wherein the urea water flow passage includes:
      a urea water supply passage through which the urea water supplied by the pump toward the urea water addition valve from the urea water tank flows; and
      a return flow passage, one end of which is connected to a portion of the urea water supply passage located between the pump and the urea water addition valve, and another end of which is arranged in the urea water tank, and
   wherein the runoff reduction control is a return flow rate reduction control that controls the reducing agent supply device such that a flow rate of the urea water flowing through the return flow passage is reduced.

7. The internal combustion engine system according to claim 1,
   wherein the runoff reduction control is an adsorbed reducing agent release control that controls the reducing agent supply device such that an $NH_3$ adsorption amount of the NOx selective reduction catalyst is reduced.

8. The internal combustion engine system according to claim 1,
   wherein the runoff reduction control is an engine discharged NOx reduction control that controls the internal combustion engine such that a concentration of NOx discharged from a cylinder of the internal combustion engine is reduced.

* * * * *